United States Patent
Kantorski et al.

[15] 3,639,066
[45] Feb. 1, 1972

[54] METHOD OF TESTING OPTICAL MATERIALS FOR MICROINHOMOGENEITIES

[72] Inventors: Joseph W. Kantorski, Southbridge, Mass.; Charles Gilbert Young, Storrs, Conn.

[73] Assignee: American Optical Corporation, Southbridge, Mass.

[22] Filed: June 18, 1970

[21] Appl. No.: 47,197

[52] U.S. Cl. ..........................................356/237, 331/94.5
[51] Int. Cl. ..................................G01n 21/16, G01n 21/32
[58] Field of Search ..................331/94.5; 356/237, 239–241, 356/200

[56] References Cited

OTHER PUBLICATIONS

Budin et al.: " On The Dynamics of Laser-Induced Damage in Glass," Applied Physics Letters, vol. 9, No. 8, Oct. 15, 1966 PP. 291– 293

Dupont et al.: " On Laser-Induced Breakdown and Fracture in Glasses," Applied Physics Letters, vol. 11, No. 9, Nov. 1, 1967, pages 271 and 272

Primary Examiner—Ronald L. Wibert
Assistant Examiner—F. L. Evans
Attorney—William C. Nealon, Noble S. Williams, Robert J. Bird and Bernard L. Sweeney

[57] ABSTRACT

Solid optical materials such as glass which are to be used in laser systems may fail catastrophically due to the presence of microinhomogeneities. These microinhomogeneities are locatable by exposing the material to a laser pulse which preferably has a pulse duration of approximately 0.1 to 10 microseconds.

10 Claims, 8 Drawing Figures

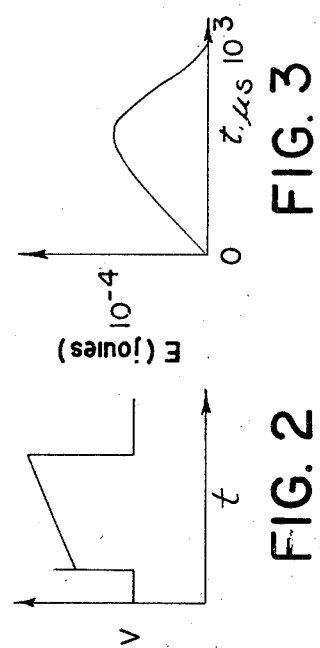
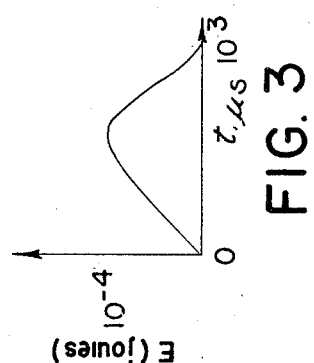
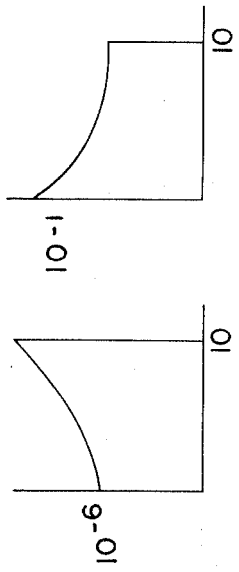
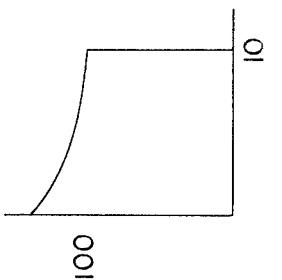
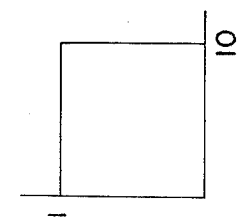

METHOD OF TESTING OPTICAL MATERIALS FOR MICROINHOMOGENEITIES

BACKGROUND OF THE INVENTION

This invention is related to improved methods for testing solid optical materials and is more particularly concerned with an improved method of testing such materials for the presence of microinhomogeneities.

A laser is a source of a highly coherent, high-intensity beam of electromagnetic radiation. The radiation is generally considered to be light although the output spectrum through which known laser materials emit ranges from the infrared to the ultraviolet. Many types of lasers are capable, in certain configurations, of emitting a beam having a very high-power density. These range from the very high-average power continuous wave gas lasers to the Q-switched solid state laser. The average power output is, of course, very different. However, the power density during operation is the parameter of present interest.

Most solid optical materials, glass and crystal, have submicroscopic particles which are not homogeneous with the surrounding mass. Many of these microinhomogeneities are of the order of 1 micrometer in diameter or less and as such are not discernible by visual means. When a laser beam or other mode of high-energy density radiation is transmitted through the material, energy is absorbed by the material of the microinhomogenity. However, the microinhomogeneities absorb energy at a faster rate than does the surrounding material. Therefore, the small localized matter expands more quickly than does the matrix material until a fracture occurs due to the thermal stresses which are set up. This fracture may be very small or it may be catastrophic. If it is small, it is still many times the size of the microinhomogeneity from which it arose. When the material is again subjected to the beam, the energy is now absorbed according to the area of the fracture. Since the absorption is related to the area of the inhomogeneity, it can be seen that under high-power density operation, eventual catastrophic failure is almost a certainty if any microinhomogeneities exist in the original material.

It is desirable, therefore, to be able to ascertain the condition of an optical material for eventual use in such systems before the expensive fabrication process is commenced. Also, premature failures of consumer items must be avoided in items of the complexity and cost of most laser systems.

SUMMARY OF THE INVENTION

It is, therefore, an object of the present invention to provide a method for testing solid optical materials for the presence of microinhomogeneities.

Another object of the invention is to provide such a method which may be performed on the solid optical materials prior to fabrication.

An additional object of the invention is to provide such a method which will allow the testing of a material without causing catastrophic failures to occur.

A further object of the invention is to provide such a method in which a piece of material is exposed to laser radiation in a manner which does not cause additional damage to the volume of the material which is unassociated with the microinhomogeneities.

A still further object of the invention is to provide such a method which may be performed quickly and inexpensively as a regular quality control operation.

Briefly, the invention in its broadest aspect comprises a method for testing a piece of solid optical material for the presence of microinhomogeneities. The method includes irradiating the piece of solid optical material with a pulsed beam of coherent radiation having a pulse width in the range approximately between 50 nanoseconds and 500 microseconds.

Further objects, advantages, and features of the invention will be apparent in the following specification taken together with the accompanying drawing.

DESCRIPTION OF THE DRAWING

In the drawing,

FIG. 2 is a plot of the signal input to the electronic Kerr cell device in the laser apparatus shown in FIG. 1, and FIGS. 3 through 8 are plots of energy versus time at various locations within the laser apparatus of FIG. 1.

DETAILED DESCRIPTION OF THE PREFERRED EMBODIMENT

Figure 1:
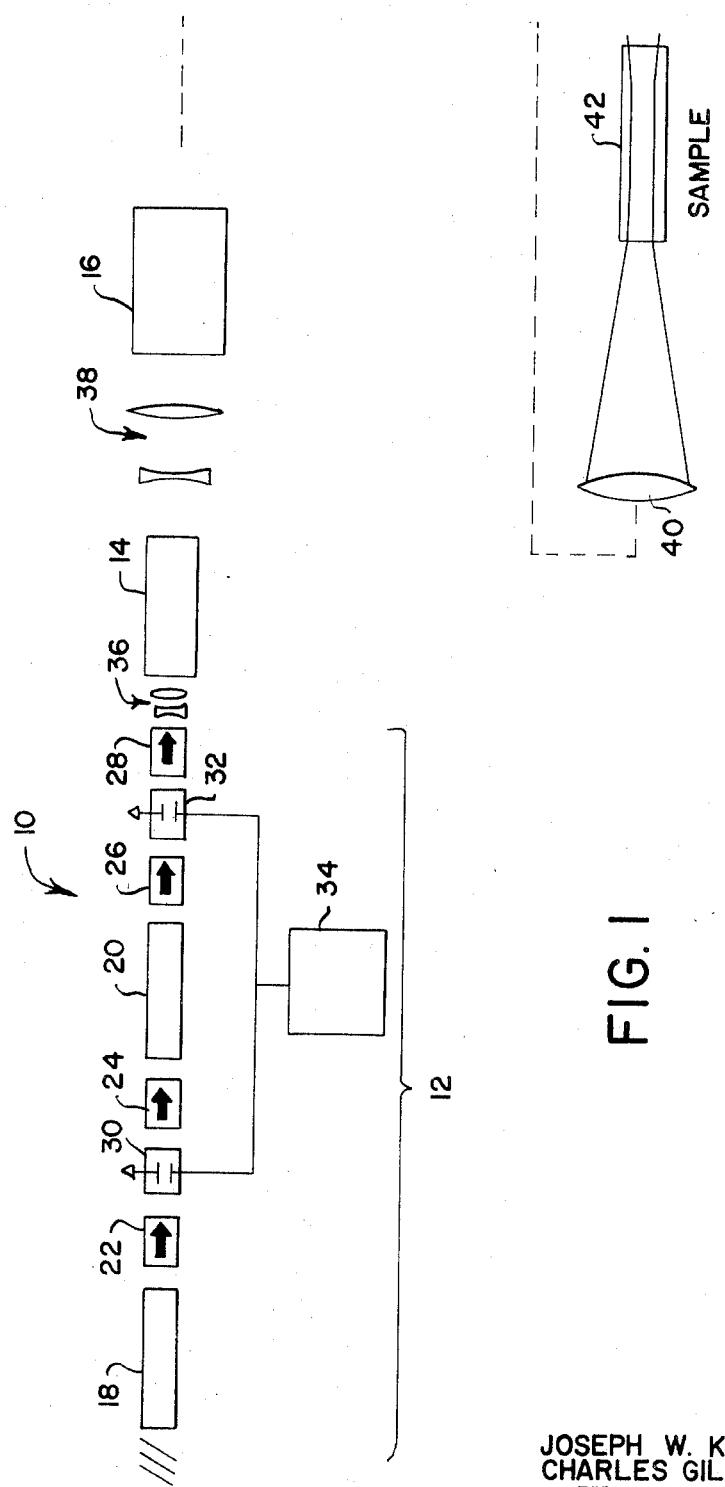
FIG. 1 is a schematic optical diagram of an amplified spontaneous emission laser which generates a laser pulse useful in the invention.

As has been noted previously, a need exists for determining the presence of microinhomogeneities in a piece of solid optical material. This is particularly true of glasses which are doped with any of the various elements which can emit laser radiation. Many of these glasses are used to form rods for high-performance lasers and; therefore, they are extremely susceptible to damage as a result of any microinhomogeneities which may be contained in the glass. At present, the majority of laser configurations in which the rods are operated near the damage threshold are the Q-switched lasers. A Q-switched laser is one in which a resonant cavity is caused not to exist about a laser rod until a very high-state of population inversion is present among the active ions. At this point, the cavity is made resonant and the energy stored in the excited ions is "dumped" nearly instantaneously, generally under 50 nanoseconds. Therefore, the high-energy output and very short pulse duration provide a high rate of energy deposition in the laser rod which can cause failure of the rod if the rod contains any of the microinhomogeneities.

Unfortunately, no practical means of ascertaining the presence of these microinhomogeneities by visual techniques has as yet been determined. The only way which is known at present is to expose the glass to laser radiation of an energy density which is high enough to cause small, but visible fractures to occur at the damage sites. It has been generally suggested that in order to attain this energy density that a Q-switched laser pulse be applied to the glass; however, it has been found that this is not generally satisfactory. The Q-switched pulse can cause damage to the glass by two additional modes, i.e., surface damage and self-focusing damage.

Experimentally, in the Q-switched time domain, the threshold for damage to the output face of an untreated glass laser rod is always lower by a factor of two to five than is the threshold for internal damage. Neither immersing the rod end in water or optically contacting an undoped section of glass to the rod end improves the situation. However, treating the glass either by a hydrofluoric acid etch or by washing it in dimethyldichlorosilane have produced a considerable increase in the resistance to damage; but the effect lasts for only a few minutes. It can, therefore, be seen that serious damage to the surface of the glass is possible if a Q-switched laser pulse is utilized to search for internal microinhomogeneities.

Furthermore, it has been found that pulses of short duration, Q-switched pulses, tend to be self-focused by a sufficient length of material. This self-focusing causes damage to the glass which is evidenced by a thin (about 1 micrometer diameter) fossil track in the glass as well as damage to the output face. This damage mechanism may be caused by an electrostrictive effect caused by nonuniformity of the cross-sectional intensity of the beam utilized for testing the glass.

To achieve a power density which is sufficiently high with a "long pulse" laser, having pulse duration of 1 millisecond or greater, requires a tremendously larger and more expensive item of equipment such that the test becomes unfeasible once again.

Additionally, it has been proposed to test a billet of laser glass by active rather than passive means, e.g., cause the billet to lase. This is not practiced for several reasons. Among these is the fact that only one end of the billet, the output end, would be fully tested due to the gain along the length of the billet. Therefore, the billet would become polarized, the output end of any elements formed from the rod would have to conform to the output end of the billet, thus increasing the cost of the finished product. Furthermore, the billets generally are greater than 3 inches in diameter. Such a rod would be impossible to pump so that the center of the rod is as equally exposed to pumping energy as the outer layers. Therefore, only the outer portions would be useable as high-performance laser rods.

However, it has been found that by irradiating the piece of material with a laser pulse having a pulse duration in the range approximately between 50 nanoseconds and 500 microseconds, the aforementioned difficulties may be overcome. In fact, the preferred embodiment of the invention utilizes a pulse with a pulse duration approximately between 0.1 and 10 microseconds. This pulse causes small discoid fractures at the microinhomogeneities; however, due to the low number of microinhomogeneities, it does not cause catastrophic failure of those glasses which are intended for eventual use in a high-intensity laser system.

An apparatus for producing a pulse of the proper duration for this test is shown schematically in FIG. 1 and is generally indicated by the reference numeral 10. This is an amplified spontaneous emission laser and is comprised of three sections, a generator 12, a driver 14, and a power amplifier 16. The generator 12 is, in turn, comprised of a pair of serially aligned neodymium doped glass laser rods 18 and 20. Each of the rods is a 1 meter in length by 15 millimeters in diameter glass laser rod which has 4 weight percent of neodymium doping within the 10 millimeter diameter core. The cladding of the Brewster-ended rods absorbs off-axis emission, transmits the pumping wavelengths, is thermally matched to the core, and has an index of refraction, at 1.06 micrometers, which is one part in 700 higher than that of the core. Total internal reflection of off-axis amplified spontaneous emission is, therefore, prevented and there is a negligible Fresnel reflection at the interface.

The neodymium doped laser rods 18 and 20 are in series optically with four Faraday rotation isolators 22, 24, 26, and 28 and two Kerr cells 30 and 32. The Faraday rotation isolators are described in copending application, Ser. No. 838,678, by C. Gilbert Young, a coinventor herein, and is assigned to the same assignee as is the instant application. The first two isolators 22 and 24 are sandwiched about the first Kerr cell 30 and are located optically between the rods 18 and 20. In like manner, the other two isolators 26 and 28 are sandwiched about the second Kerr cell 32 and are located optically after the laser rod 20. The optical isolators prevent feedback and thereby lend gain stability to the system. The Kerr cells serve to truncate and shape a portion of the amplified spontaneous pulse in the desired manner. The Kerr cells are driven by an associated electronic circuit 34 which supplies the signal shown in FIG. 2 to the Kerr cells 30 and 32. The amplified spontaneous pulse which is emitted from the first laser rod 18 is shown in the plot of FIG. 3. The input pulse to and the output pulse from the second laser rod 20 are shown in FIGS. 4 and 5 respectively. As can be seen in FIG. 6, the output pulse from the generator 12 has the desired pulse shape. It should be noted at this time that by changing the particular Kerr cells and by adjusting circuit 34 that the duration of the pulse may be freely altered to meet test requirements. However, it should also be noted that a shortening of the pulse duration inherently lowers the energy output from the apparatus.

Following the generator 12 is a first afocal telescope 36 which reduces the beam spread and matches the beam diameter to the 18-millimeter diameter of the 1-meter long driver rod 14. The driver rod 14 is doped with approximately 3 weight percent of neodymium. The amplified output pulse from the driver rod 14 is shown in FIG. 7.

The driver output pulse passes through a second afocal telescope 38 having the same basic functions as the first afocal telescope 36. The broadened beam now enters the power amplifier rod 16. The plot of the amplified output pulse therefrom is shown in FIG. 8. This pulse is then collected by a lens 40 and the sample 42 is exposed to the resulting beam.

As can be seen from FIG. 8, this apparatus can provide the desired pulse for this test. The pulse has approximately 100 joules of energy and lasts approximately 10 microseconds. This has been found to be a satisfactory energy content for this duration of pulse; however, at the shorter pulse durations, lower energy levels are necessary. The effective range of energy levels generally is between 10 and 200 joules. The test pulse shown in FIG. 8 is free of any spikes and is quite uniform across the beam.

This type of pulse is very advantageous for this test for several reasons. Among these is the elimination of self-focusing damage because of the beam uniformity; surface damage is eliminated due to the far higher damage threshold for longer pulse lengths; the threshold for internal damage due to inclusion of microinhomogeneities is only raised by a factor of about two; the size of the failures may be controlled by varying the pulse duration; and the entire piece of material may be tested uniformly without destroying the billet.

The normal "as-cast" billet of laser glass is approximately 40 cm.$^2$ in cross-sectional area; therefore, the entire area of the billet cannot be tested simultaneously with the above apparatus. The cross-sectional area irradiated per scan with the above apparatus is approximately 0.5 cm.$^2$ and the entire cross-sectional area is scanned by repetitive testing. However, depending upon the power of the apparatus, it is possible to test an entire billet at once.

Applicants have found that the 10-microsecond pulse duration causes a maximum size fracture for a given small microinhomogeneity size. For example, for a certain size of inclusion, the 10-microsecond pulse causes a fracture of a few centimeters in diameter, a 1-microsecond pulse yields a fracture diameter of a few millimeters, and a 0.1-microsecond pulse causes fractures having only a few tenths of a millimeter diameter. It is generally attempted to prevent the discoid fractures from becoming too large, the purpose of the test being only to locate the included microinhomogeneities. However, the fracture size must be large enough so that it can be seen within the material. In a billet of laser glass where erbium is the active dopant, the fracture size must be somewhat larger due to the poor visual transmittance of this glass. Therefore, the test may be adjusted to match the probable condition of the rod.

A technique which is often utilized is to irradiate the entire billet area two or more times. This procedure serves to locate even many very small inclusions because the first scan causes a small localized growth of the inclusion and the second scan causes a fracture large enough to be seen by an observer. This double-exposure process greatly increases the changes of locating even very minute inclusions.

Once a billet has been exposed to the radiation, it is visually inspected for the characteristic discoid fractures associated with the microinhomogeneities. The failure is generally not catastrophic under the above energy densities and pulse durations and the billet may often be salvaged by forming the finished optical elements from the undamaged portions of the billet if the fracture size is kept to a minimum. This greatly reduces the cost of the resulting elements because failures at later stages of testing due to the microinhomogeneities are eliminated.

Although the above description has been limited generally to glasses and particularly to laser glasses, it is quite obvious that this method is equally applicable to all solid optical materials which are transparent to the radiation utilized. The source of this radiation need not be matched to the material to be tested in any other manner except transparency.

While there have been described what are considered to be preferred embodiments of the present invention, it will be obvious to those skilled in the art that various changes and modifications may be made therein without departing from the invention as defined in the appended claims.

I claim:

1. A method of testing a piece of solid optical material for the presence of microinhomogeneities, which comprises irradiating the piece of solid optical material with a pulsed beam of coherent radiation, each pulse having an approximately square shape and having a pulse width in the range approximately between 50 nanoseconds and 500 microseconds and inspecting the piece of solid optical material for discoid fractures following irradiation by the pulsed beam of coherent radiation.

2. A method according to claim 1, comprising sequentially irradiating portions of the piece until all portions have been exposed to the radiation.

3. A method according to claim 1, comprising irradiating said piece a plurality of times by the pulsed beam of coherent radiation.

4. A method according to claim 1, comprising irradiating said piece two times by the pulsed beam of coherent radiation.

5. A method according to claim 1, comprising restricting the pulse width to the range approximately between 0.1 microsecond and 10 microseconds.

6. A method according to claim 5, comprising restricting the energy contained in the pulse to the range approximately between 10 and 200 joules.

7. A method according to claim 1, comprising irradiating a glass.

8. A method according to claim 7, comprising irradiating a doped laser glass.

9. A method according to claim 1, comprising irradiating a crystalline material.

10. A method according to claim 9, comprising irradiating a doped crystalline laser material.

* * * * *